United States Patent [19]  
Dougherty et al.

[11] Patent Number: 4,973,796  
[45] Date of Patent: Nov. 27, 1990

[54] ELECTRIFIED WALL STRUCTURE

[75] Inventors: Russell Dougherty, Columbus, Ohio; Richard J. Stark, Plainview; Seymour Kassimir, Oceanside, both of N.Y.

[73] Assignee: Visu-Wall by HBSA Industries, Inc., Brooklyn, N.Y.

[21] Appl. No.: 392,109

[22] Filed: Aug. 10, 1989

[51] Int. Cl.⁵ .................... H01R 25/06; H01R 25/16
[52] U.S. Cl. ..................................... 174/48; 439/117; 439/215
[58] Field of Search .............. 439/110, 113, 114, 116, 439/117, 118, 119, 120, 121, 207, 209, 211, 214, 215, 216; 52/36, 220, 221; 174/48, 49

[56] References Cited

U.S. PATENT DOCUMENTS

| 3,649,741 | 3/1972 | Fremont | 439/110 |
| 3,733,755 | 5/1973 | Butler . | |
| 3,919,457 | 11/1975 | Steiner | 439/110 |
| 4,370,838 | 2/1983 | Vermillion . | |
| 4,459,790 | 7/1984 | Vermillion . | |
| 4,646,211 | 2/1987 | Gallant et al. | 439/209 |
| 4,795,355 | 1/1989 | Dorn et al. | 439/215 |

Primary Examiner—Eugene F. Desmond  
Attorney, Agent, or Firm—Amster, Rothstein & Ebenstein

[57] ABSTRACT

A wall structure for removably positioning panels and brackets is provided with a pair of electrical buses adapted to be contacted by an electrical clip at any one of a plurality of different heights.

12 Claims, 6 Drawing Sheets

ELECTRIFIED WALL STRUCTURE

BACKGROUND OF THE INVENTION

The present invention relates to a wall structure for removably positioning panels and brackets and, more particularly, to such a wall structure which is electrified so that it can supply electrical power to clips placed therein.

Modular wall structures (frequently referred to as modular partitions, curtain walls or paneling systems) are well-known in the art; see, for example, U.S. Pat. No. 4,459,790, U.S. Pat. No. 4,370,838, and U.S. Pat. No. 3,733,755. Such wall structures typically include a pair of elongated horizontally-extending upper cap and lower sill channel members which are attached in predetermined, vertically spaced relation either on an existing wall or on a ceiling and floor, respectively. The channel members support and hold a plurality of transversely or laterally spaced apart, vertically elongated studs or posts on which are mounted modular wall panels. The vertical studs are configured and dimensioned so that they removably maintain the modular wall panels appropriately positioned using any one of a variety of different engaging or abutting techniques. For example, the panel back may have projecting hooks along its vertical edges which enter into slots provided on the studs.

The wall structures are frequently employed to remodel and redecorate the interior vertical walls of a retail sales room or other merchandise display room. Accordingly, the vertical studs typically not only provide means for removably suspending the modular wall panels, but also provide means for removably suspending brackets, the brackets in turn being adapted to support modular furniture, such as book shelves, merchandise display shelves, etc.

In one respect especially, the known wall structures have not proven to be entirely satisfactory in use. Especially when such wall structures are used in stores or similar merchandise-display settings, but also even when they are used in offices or homes, it is frequently desirable to connect lamps or other devices requiring electrical energization with an external power supply. Such devices may be directly mounted on the studs (using, for example, one of the brackets which the stud is adapted to support) or indirectly mounted therein (for example, by resting on a shelf supported by brackets connected to a pair of laterally spaced studs). As the known wall structures themselves are not electrified, various conventional techniques have been employed to enable such devices to be powered. For example, where one of the modular wall panels happens to cover an existing electric socket in a wall therebehind, an access opening may be cut into the modular wall panel, in alignment with the wall socket, to provide access to the latter and permit a wire to be extended between the wall socket and the device. Alternatively or in addition thereto, wires connected at one end to a remote wall socket or other power supply may be passed over or under the modular wall panels and then extended first vertically, typically along the outside of the stud, to the appropriate height for the device to be energized and then horizontally along the shelf where the device is not immediately adjacent the stud. The horizontal travel of the wire is not objectionable because the average horizontal travel is less than half the lateral spacing between studs and therefore not particularly long. Further, the horizontal travel of the wire is typicallY at least partially concealed behind the merchandise being displayed on the shelf and therefore tends to be relatively unnoticeable. On the other hand, the vertical travel of the wire may be almost the full length of the stud (that is, almost from floor to ceiling), and there is less opportunity to conceal the same, so that it is typically immediately apparent and therefore aesthetically objectionable. This is especially true where the wire extends from the top or bottom of the stud and must be used on a shelf which is adjacent the opposite end of the stud.

Accordingly, it is an object of the present invention to provide an electrified wall structure which not only removably positions panels and brackets, but provides energization outlets at any of a plurality of different heights.

Another object is to provide such a wall structure which substantially eliminates the need for vertical travel of a wire along the outside of a stud.

A further object is to provide a clip adapted for use in such an electrified wall structure.

BRIEF DESCRIPTION OF THE DRAWING

The above brief description, as well as further objects and features of the present invention, will be more fully understood by reference to the following detailed description of the presently preferred, albeit illustrative embodiments of the present invention when taken in conjunction with the accompanying drawing wherein.

SUMMARY OF THE INVENTION

Figure 1:
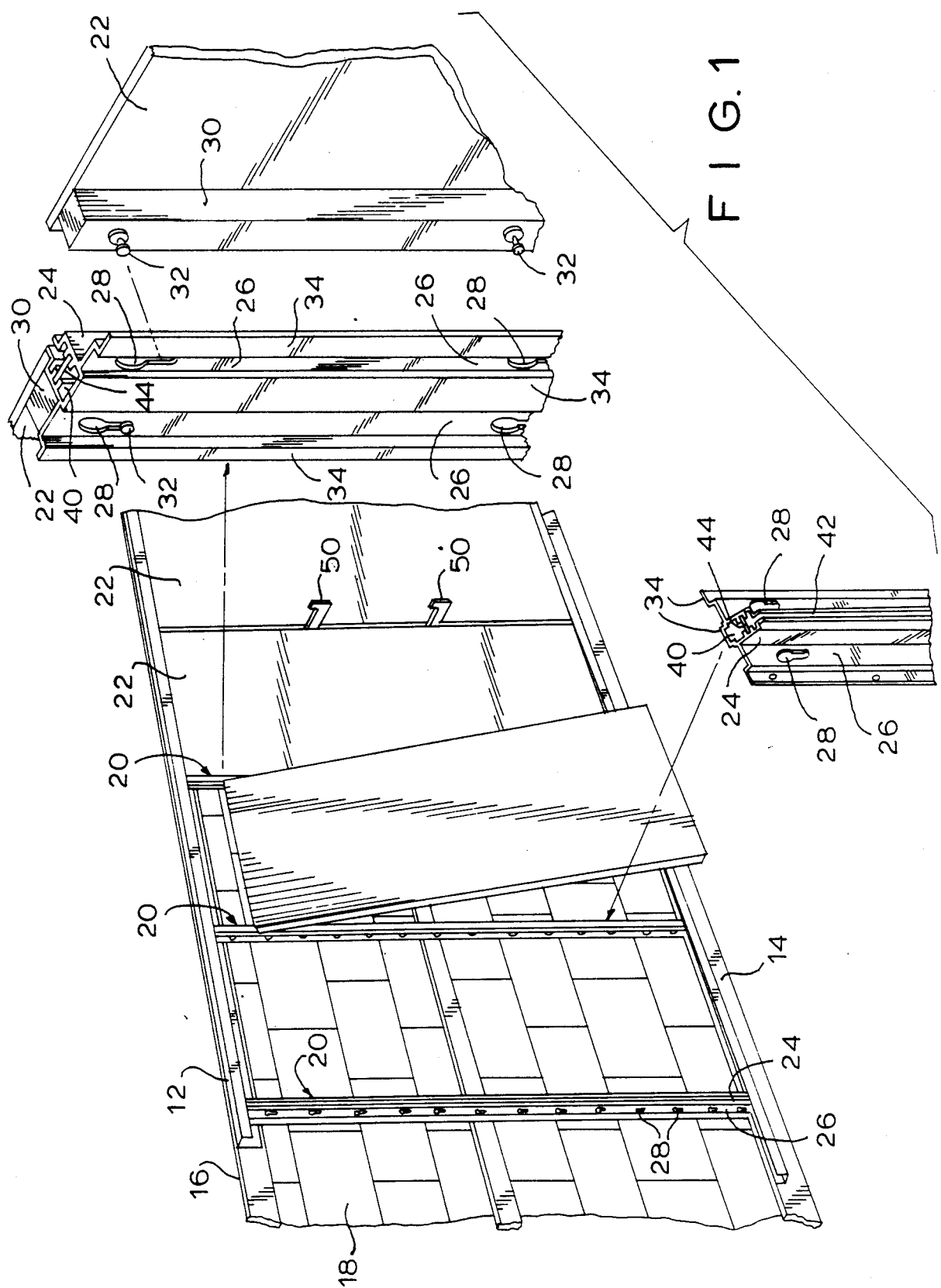
FIG. 1 is a fragmentary isometric view of a partially assembled wall structure of the present invention, with all electrical aspects thereof being deleted for clarity of illustration, and with portions thereof fragmentarily illustrated in enlarged views.

It has been found that the above objects and features of the present invention are obtained by electrifying a conventional wall structure for removably positioning panels and brackets. The conventional wall structure includes bracket-anchoring strips for removably supporting a bracket at any of a plurality of different heights and a pair of laterally spaced apart, parallel, vertically arranged studs. Each stud defines a pair of laterally spaced apart, parallel, longitudinally extending, forwardly projecting panel-separating ribs forming together a longitudinally extending internal chamber therebetween housing one of the bracket-anchoring strips in longitudinal orientation, and a longitudinally extending narrow aperture in the front of the internal chamber making the bracket-anchoring strip in the internal chamber accessible by a bracket from the front of the stud. The studs define together means for removably positioning a panel therebetween.

According to the present invention, a pair of laterally spaced apart, parallel, longitudinally extending, electrically conductive buses are disposed at least partially in the internal chamber intermediate the narrow aperture and the bracket-anchoring strip without blocking access of the bracket to the bracket-anchoring strip. Means are provided for electrically connecting the buses to an electrical power supply.

The present invention also encompasses a clip adapted for use with the wall structure. The clip has an electrically insulative narrow body with an outwardly biased electrical contact disposed laterally on each side thereof and an end portion adapted to be removably anchored by the bracket-anchoring strip. The clip is configured and dimensioned such that, when the end portion thereof is inserted through the narrow aperture of one stud and anchored by the bracket-anchoring strip at any one of a plurality of different heights, the outwardly biased electrical contacts of the clip are in electrically conductive contact with both buses of the one stud.

The present invention further encompasses an electrified wall structure for removably positioning panels, clips and brackets and electrically energizing the clips. The structure comprises a pair of the aforesaid studs, an anchoring strip in each stud for removably receiving a clip or bracket at any of a plurality of different heights, a pair of the aforesaid buses in each stud disposed at least partially in the internal chamber intermediate the narrow aperture and the anchoring strip without blocking access of a clip or bracket to the anchoring strip, and means in the stud for electrically connecting the buses to an electrical power supply. The structure further includes a bracket having a narrow end portion inserted through the narrow aperture of one stud and anchored by the anchoring strip, and the aforesaid clip.

In a preferred embodiment the buses extend substantially the entire length of the stud, are disposed in each stud rearwardly of the narrow aperture and forwardly of the bracket-anchoring strip, and are accessible from the front of the stud only through the narrow aperture, which is so narrow as to preclude passage of a human finger therethrough. The studs are formed substantially of electrically conductive metal and may additionally include a pair of longitudinally extending, electrically insulative guards or carriers disposed at least partially within the internal chamber without blocking access of the bracket to the bracket-anchoring strip. Each guard receives therein the longitudinal length of a respective one of the buses and cover all sides of the one bus except for the longitudinal length thereof adapted to be contacted by the electrical contact of a clip removably anchored by the bracket-anchoring strip. The guard is secured to the internal chamber and slidably receives and appropriately positions the one bus within the stud.

DETAILED DESCRIPTION OF THE PREFERRED EMBODIMENTS

Referring now to the drawing, in particular to FIG. 1 thereof, therein illustrated is a wall structure according to the present invention with the electrical aspects thereof removed for clarity of illustration. Two vertically spaced, horizontally extending members—an upper channel member 12 and a lower or sill channel member 14—are secured to horizontally extending furrings 16 mounted on a support wall 18. Alternatively, the upper and lower channel members 12, 14 may be mounted on the ceiling and the floor, respectively, or on furrings attached to the ceiling and floor. A plurality of post or studs, generally designated by the reference numeral 20, are secured to the upper and lower channel members 12, 14 in laterally spaced apart, parallel, vertical disposition. The studs 20 extend between the upper and lower channel members 12, 14 and in turn removably support and space apart a plurality of modular wall panels 22, each modular wall panel 22 being disposed intermediate a pair of studs 20. The channel members 12, 14 and stud 20 are typically formed of a metal, such as aluminum.

Each stud 20 defines a pair of laterally spaced apart, parallel, longitudinally extending and forwardly projecting ribs 24, a pair of the ribs 24 separating adjacent modular wall panels 22. The studs 20 define together, and sometimes in connection with the upper and lower channel members 12, 14, means for removably positioning a modular wall panel 22 therebetween. As illustrated, each stud 20 defines a pair of laterally-extending flanges or wings 26 provided with a series of vertically aligned, but vertically spaced apart keyhole-configured apertures 28 The modular wall panels 22 are provided, along the back of each vertical edge thereof, with a vertically extending furring 30 having disposed thereon a rearwardly projecting key or knob 32. The knob 32 includes an enlarged free end portion adapted to be easily passed through the enlarged upper portion of the keyhole aperture 28 as the top end of panel 22 is lifted above its final position and moved rearwardly and a reduced diameter shank adapted to be removably received within the narrower lower portion of the keyhole aperture 28 as the top end of the panel is dropped into its final position. Each stud 20 is further provided with various spacing flanges 34 projecting rearwardly from the back thereof to space the keyhole-defining flanges 26 from the wall 18 by a distance sufficient to accommodate the free end of the knob 32 which projects rearwardly from the keyhole aperture 28 when the modular wall panel 22 is secured to the stud 20. Alternatively the studs 20 may define other means for removably positioning the modular wall panel 22 therebetween, for example, as disclosed in U.S. Pat. No. 3,733,755, U.S. Pat. No. 4,370,838 and U.S. Pat. No. 4,459,790.

Figure 2:
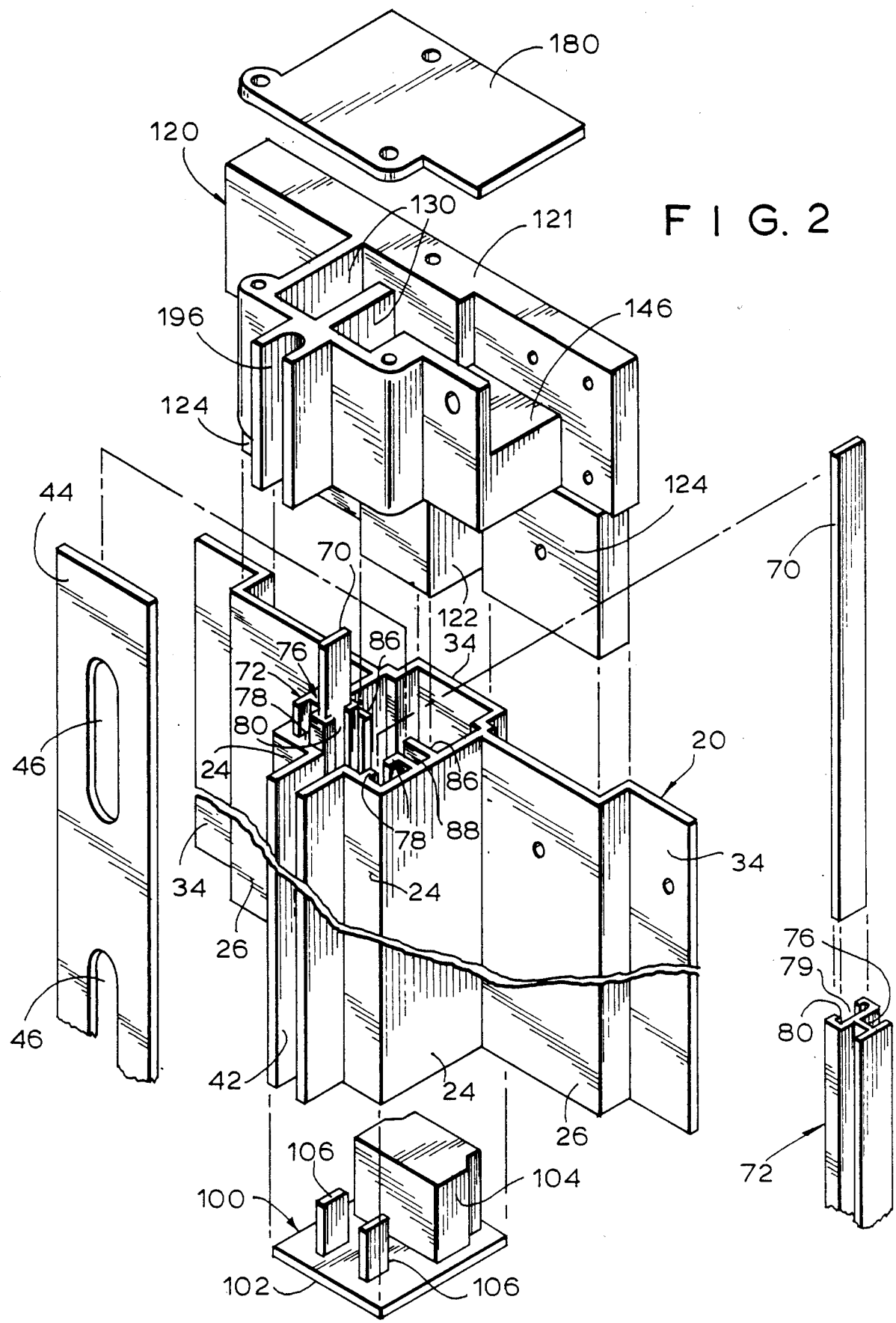
FIG. 2 is a fragmentary exploded isometric view, to an enlarged scale, of one of the studs of the wall structure, with screws and connecting wires being removed for clarity of illustration.

The ribs 24 form together a longitudinally extending internal chamber 40 therebetween, with a longitudinally extending narrow aperture or access channel 42 in the front thereof providing frontal access to the internal chamber 40. A bracket-anchoring strip 44 (as best seen in FIG. 2) is disposed in the internal chamber 40 and accessible by a bracket 50 from the front of the stud 20 via the narrow aperture 42. As is conventional, the bracket-anchoring strip 44 defines a series of vertically spaced, but vertically aligned, longitudinally extending slots 46 adapted to engagingly receive and support the downwardly turned L-shaped hook ends of brackets 50. As the non-electrified wall structure described thus far is conventional in nature and well known to those skilled in the art, further details of the structure and possible variations thereof need not be presented herein.

Referring now to FIGS. 2-7 in particular, it has now been found that the above-described wall structure may be electrified by providing a pair or laterally spaced apart, parallel, longitudinally extending, electrically conductive buses disposed at least partially in the internal chamber 40 of each stud 20. The buses 70 are laterally spaced apart in face-to-face relation to permit the aperture 42 intermediate the ribs 24 to extend rearwardly towards the back of the internal chamber 40. The internal chamber 40 is appropriately configured and dimensioned to maintain the buses 70 laterally spaced apart and parallel, with the buses extending longitudinally for substantially the full length of the stud 20 (except for a bottom portion thereof, as noted hereinbelow) and projecting slightly from the top thereof.

Where the stud 20 is formed of a non-electrically conductive material, the buses 70 may be directly snugly slidably received in and positioned by the internal chamber 40. However, as the stud 20 is typically formed of an electrically conductive metal, as illustrated the interior chamber 40 is configured and dimensioned to engage and support a pair of longitudinally extending, electrically insulative guards or bus carriers, generally designated 72, each carrier 72, in turn supporting and positioning a respective bus 70. More particularly, each carrier 72 defines a reduced width shank portion 76 which is snugly slidably received in and engaged by fixed jaws 78 on the inner surface of the internal chamber 40 of the stud 20 to maintain the carrier 72 in the appropriate position. Each carrier 72 additionally defines an open faced channel 79 configured and dimensioned to snugly slidably receive therein a bus 70 and maintain that bus 70 in the appropriate position by a friction fit, so that the internal chamber 40, acting through the jaws 78, maintains the carrier 72, and thus the stud 70, in the appropriate position. The open-faced channel 79 electrically isolates its bus 70 from the remainder of the stud 20, permitting access to the face of bus 70 only through the open face 80 of the channel 79. The internal chamber 40 maintains the carriers 72 in a disposition such that the open faces 80 of the channel 79 of the respective carriers 72 (and thus the faces of their buses 70) are in opposed or confronting laterally spaced apart relationship.

The internal chamber 40 further defines a pair of opposed inwardly-directed flanges 86 disposed behind the jaws 78 and cooperating with the rear jaw 78 of each pair of jaws 78 to define a recess 88. The recesses 88 are laterally aligned, but laterally spaced apart, so that a bracket-anchoring strip 44 may be positioned within the internal chamber 40. Each opposed lateral side of the strip 44 is snugly slidably received in a respective recess 88 and therein supported and maintained by the flange 86 and rear jaw 78 defining such recess 88. The carriers 72 are configured, dimensioned and positioned within the internal chamber 40 so as not to interfere with the extension of the aperture 42 rearwardly, the rearward extension of the aperture 42 being terminated, however, by the strip 44. Thus none of the ribs 24, carriers 72, or buses 70 blocks access of the bracket 50 to the strip 44 (and in particular the slots 46 thereof) via the narrow aperture 42 and its rearward extension. The narrow aperture 42 is preferably sufficiently narrow that access to the buses 70 through the open faces 80 of carriers 72 cannot be made even by the fingers of a child, thereby to prevent accidents caused by inadvertent contact with an electrified bus 70 through the narrow aperture 42.

An electrically insulative base generally designated 100 is friction fit to the bottom end of each stud 20, thereby preventing access to the buses 70 via the bottom of the stud. The base 100 is conveniently formed of a relatively thin, flat, rectangular member 102 having projecting upwardly from its upper surface a large boss 104 and two relatively smaller bosses 106. Each of the smaller bosses 106 is vertically aligned with and has a cross-section identical to one of the buses 70. The small bosses 106 are relatively short in vertical length and are snugly slidably received within and frictionally retained by the unoccupied bottom portions of the channels 79—i.e., the bottom portions not occupied by the buses 70. The large boss 104 is configured and dimensioned to be snugly slidably received within and frictionally retained by the unoccupied bottom portion of a rear segment of the internal chamber 40—that is, the segment of the internal chamber 40 behind its flanges 86 and in front of its rear spacing wall 34. Thus the bosses 104, 106 are snugly slidably received by the stud 20 (and more particularly the large boss 104 is received by the rear segment of the internal chamber while the small bosses 106 are received by the carrier channels 79) to effect a friction fit. The planar element 102 or the small bosses 106, and preferably the entire base 100, is composed of a non-conductive plastic to preclude accidental electrical contact with an electrified bus 70 through the bottom end of a channel 79.

To facilitate electrification of the buses 70 while precluding accidental electrical contact with an electrified bus 70 through the top end of a channel 79, each stud 20 is provided with a cover generally designated 120. Just as the base 100 is provided with upwardly extending bosses 104, 106 to engage the bottom end of the stud 20, the cover 120 is provided with downwardly extending bosses 122, 124 which are snugly slidably received in the top end of the stud 20 to effect a friction fit securing the cover 120 to the stud 20. As illustrated, the cover 120 has a body portion 121 and three downwardly extending bosses, a middle boss 122 and two side bosses 124. The middle boss 122 is configured and dimensioned to be snugly slidably received within the internal chamber 40 of the stud 20 and, more particularly, within the rear segment of the internal chamber 40 behind the flanges 86. The side bosses 124 of the cover 120 are adapted to be received behind the laterally extending flanges or wings 26, without extending rearwardly beyond the spacing portions 34 adapted to abut the wall 18. The three bosses 122, 124 are configured and dimensioned and positioned relative to one another to snugly engage the top end of the stud 20 in a friction fit, especially between the rear surface of the middle boss 122 and the front surface of the side bosses 124.

Figure 6:
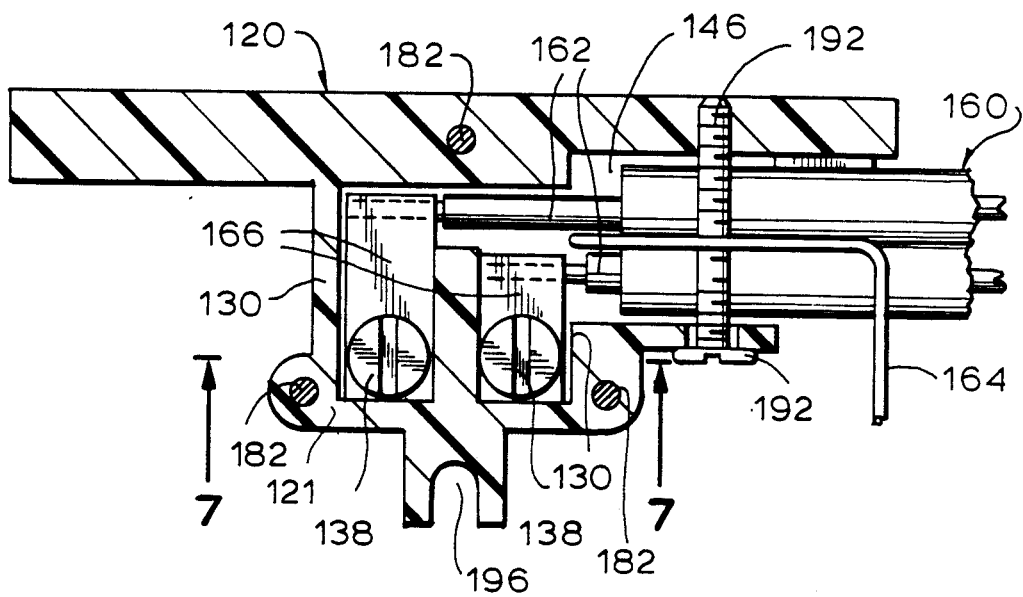
FIG. 6 is a fragmentary sectional top plan view taken along the line 6—6 of FIG. 5.
Figure 7:
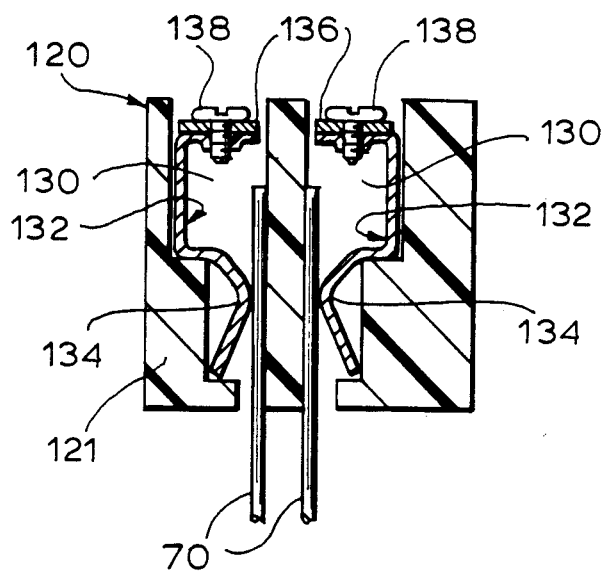
FIG. 7 is a fragmentary sectional front elevation view taken along the line 7—7 of FIG. 6.

As best seen in FIGS. 6 and 7, the cover 120 defines a pair of laterally spaced apart, open-bottomed, internal chambers 130. Disposed in each chamber 130 is a longitudinally extending resilient electrical contact generally designated 132. The open-bottom chambers 130 are vertically aligned with the buses 70 so that the top end of a bus 70 (that is, the portion of the bus 70 projecting above the top of a carrier 72) is slidably received in the bottom end of a respective chamber 130, where it is resiliently contacted by the curved bottom portion 134 of an electrical contact 132. The cover 120 prevents accidental electrical contact with the upper ends of the conductive buses 70, while at the same permitting the intentional energization of the buses 70 via the contacts 132. The upper end 136 of each contact 132 defines an internally threaded aperture and is provided with a screw 138 passing through the internally threaded aperture to facilitate electrical connection of a power source to the contact 132.

Figure 3:
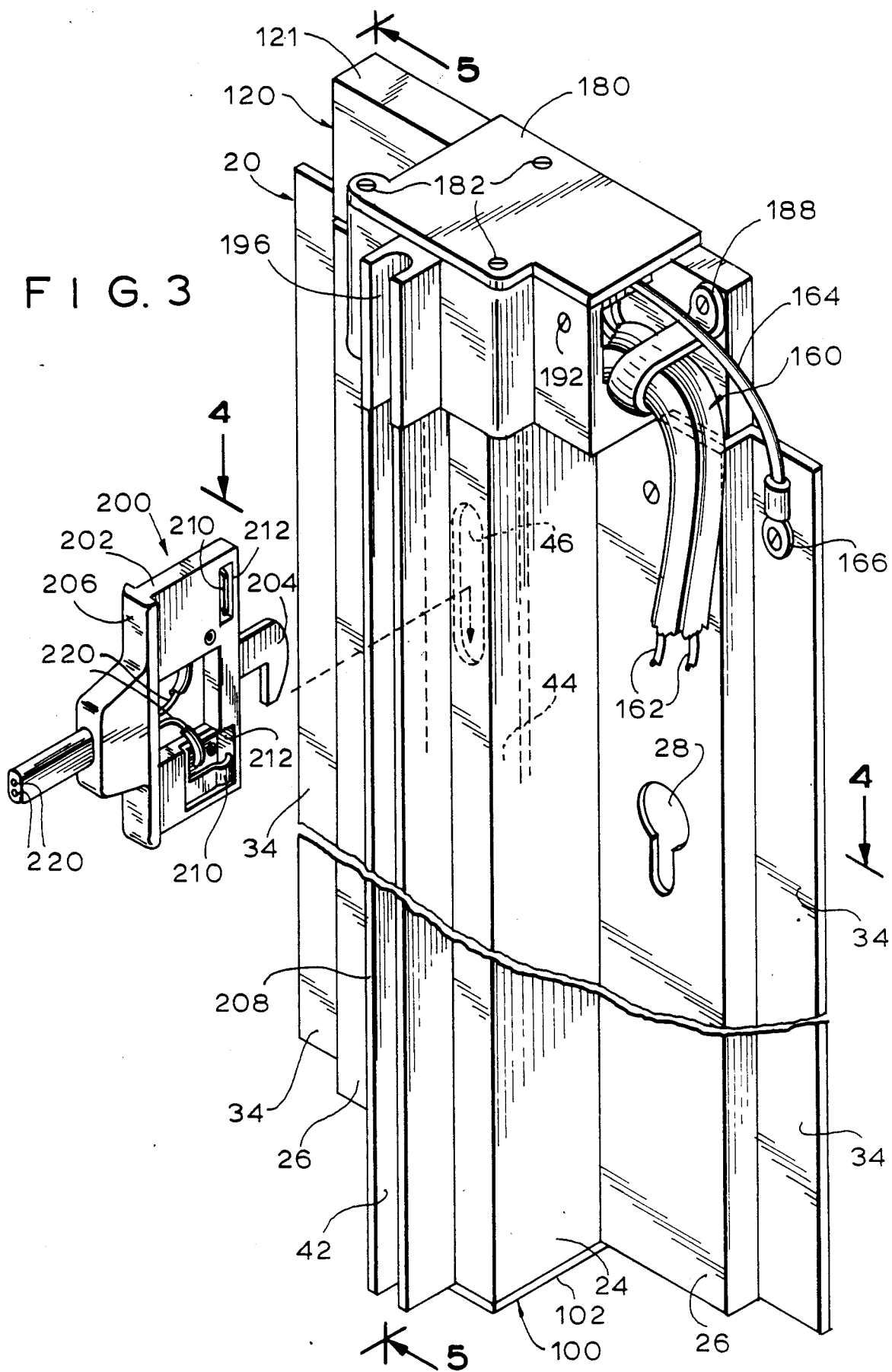
FIG. 3 is a fragmentary isometric assembly view of the stud of FIG. 2, additionally including the electric wiring and a clip adapted for use therewith.
Figure 4:
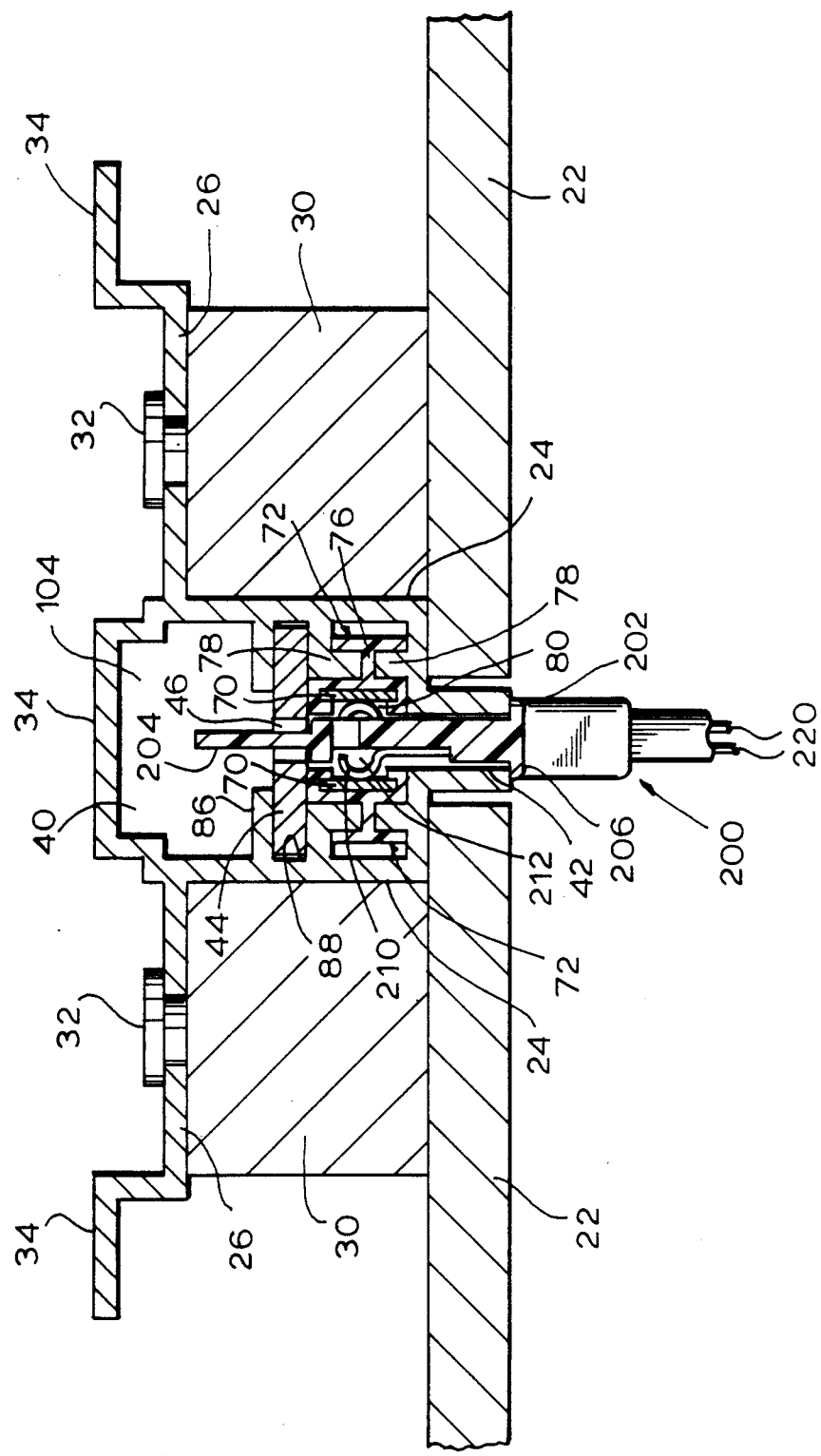
FIG. 4 is a fragmentary sectional top plan view taken along the line 4—4 of FIG. 3.
Figure 5:
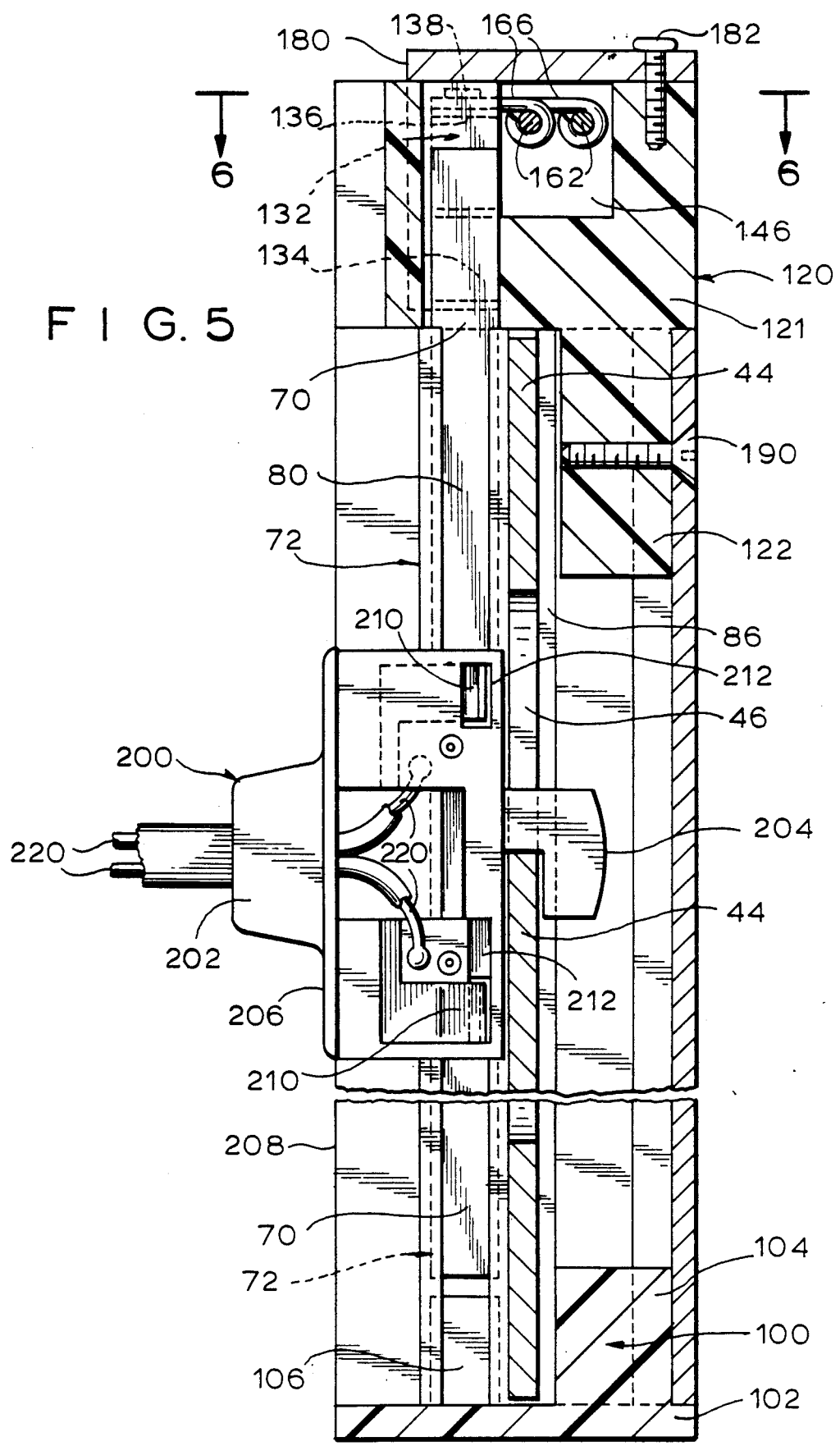
FIG. 5 is a fragmentary sectional side elevation view taken along the line 5—5 of FIG. 3.

The cover 120 further defines a horizontally extending passage 146 laterally communicating with both chambers 130 so that a power supply generally designated 160 may be connected to the contacts 132. The power supply 160 (best seen in FIGS. 3 and 6) typically comprises a three wire conduit providing one live wire 162 to each of the contacts 132 and a safety or ground 164. Each of the wires 162, 164 is provided with a conventional apertured lug 166 at the end thereof. The lugs 166 of live wires 162 are adapted to be secured to the tops 136 of contacts 132 by means of screws 138 (as best seen in FIG. 6), while the lug 166 of ground 164 is adapted to be secured to a suitable conductive portion of the stud 20 such as spacing flange 34 (as best seen in FIG. 3) to provide suitable grounding.

A non-conductive top panel 180 is removably secured to the upper surface of the cover 120 by means of screws 182 (see FIG. 5) to cover and close the tops of the chambers 130 and the passage 146, thereby to prevent accidental electrical contact with the contacts 132. Optionally a bracing element 188 (see FIG. 3) may be used to fasten the sheathed power supply 160 to the cover 120.

Preferably, although not necessarily, the frictional engagement between the stud 20, on the one hand, and the base 100 and cover 120, on the other hand, unites the three elements 20, 100, 120 sufficiently to enable them to be moved together as a unit without the use of additional securing means such as glue, screws, fasteners or the like, although the same may be used if desired. Thus, if desired, screws 190 (see FIG. 5) may be used to further secure the cover 120 (or base 100) to the stud 20. Screws 192 (see FIG. 6) may optionally be used to structurally strengthen the cover 120 and assist in maintaining the power supply 160 secured thereto.

The power supply 160 may terminate in a conventional three-prong plug (not shown) having two live wires and a ground and being adapted to be inserted into any convenient power supply, such as a wall socket, for providing energization of the buses 70. For particular applications, the flexibility inherent in the embodiment illustrated may be dispensed with and the wires 162 may be hardwired (e.g., soldered) to the tops 136 of contact 132, or even directly to the tops of the buses 70. In this instance the top 180 may optionally be permanently affixed to the cover 120 (for example, by sonic welding or cementing) and the ground 164 may also be permanently secured to the stud 20 (for example, by soldering or conductive cementing).

As illustrated, the front of the- cover 120 includes a Pair of forwardly extending flanges defining a longitudinally extending groove 196 which is vertically aligned with the narrow aperture 42 defined by the ribs 24. These forwardly extending flanges of the cover 120 are non-functional and present only for aesthetic purposes.

A clip generally designated 200 is adapted for use with the stud 20 of the present invention. The clip 200 has an electrically insulative narrow body 202 defining at its forward end a downwardly turned L-shaped hook 204, similar to that found at the forward end of the bracket 50, and at its rear end a grasping portion 206 of wider dimensions. The clip body 202 is adapted to partially enter the narrow aperture 42, with the hook 204 engaging a slot 46 of the anchoring strip 44. The grasping portion 206 is adapted to abut the foremost face 208 of the ribs 24 defining the narrow aperture 42. Thus the engagement of the clip hook 204 and strip slot 46 at the front end of the clip 200 and the engagement of the clip grasping portion 206 and the stud foremost face 208 cooperatively position and removably lock the clip 200 and stud 20 in a reliable and predictable manner for the purposes indicated hereinafter.

A resilient, electrically conductive contact 210 is mounted on each side of the insulative clip body 202, one adjacent the bottom of the clip and one adjacent the top of the clip. The contacts 210 are configured and dimensioned such that, when the clip 200 is appropriately positioned in the stud 20 as described hereinabove, each clip contact 210 is in electrical contact with a respective one of the buses 70 of the stud 20. Each contact 210 includes a curved or bowed portion which is biased to bow or extend outwardly from the clip body 02 and be deflected inwardly (toward the other side of the clip body 202) by the studs 70 when the clip 200 is appropriately positioned in the stud 20. The clip body 202 defines adjacent the forward end thereof a pair of separate recesses 212, preferably extending completely through the clip body 202, to receive respective free end portions of the contacts 210 as they are forced inwardly by the buses 70. If the recesses 212 extend completely throughout the clip body 202, as illustrated, the contacts 210 must be configured and dimensioned such that, even when they are completely deflected by the buses 70, the free tips thereof do not extend through the recesses 212 outwardly beyond the other side of the clip body 202, as that might introduce a potential short circuiting problem. Each contact 210 is in electrical engagement with a respective wire 220, which extends rearwardly through the grasping portion 206 of the clip 200 and is connected to a device (not shown) intended to be electrified by the stud 20 via the clip 200. Such a device may be a lamp, an article of merchandise, an electrified sign, or the like.

The clip 200, like the bracket 50, may be inserted into the stud at any one of a plurality of different heights

We claim:

1. In a wall structure for removably positioning panels and brackets including bracket-anchoring strips for removably supporting a bracket at any of a plurality of different heights and a pair of laterally spaced apart, parallel, vertically arranged studs, each said stud defining a pair of laterally spaced apart, parallel, longitudinally extending, forwardly projecting panel-separating ribs forming together a longitudinally extending internal chamber therebetween housing one of said bracket-anchoring strips in longitudinal orientation and a longitudinally extending narrow aperture in the front of said internal chamber making said bracket-anchoring strip in said internal chamber accessible by a bracket from the front of said stud, said studs defining together means for removably positioning a panel therebetween;

the improvement comprising a pair of laterally spaced apart, parallel, longitudinally extending, electrically conductive buses disposed at least partially in said internal chamber intermediate said narrow aperture and said bracket-anchoring strip without blocking access of the bracket to said bracket-anchoring strip; and means for electrically connecting said buses to an electrical power supply;

whereby a clip having an electrically insulative narrow body with an outwardly biased electrical contact disposed laterally on each side thereof and an end portion adapted to be removably anchored by said bracket-anchoring strip will, when the end portion thereof is inserted through said narrow aperture of one stud and anchored by said bracket-anchoring strip at any one of a plurality of different heights, have the outwardly biased electrical contacts thereof in electrically conductive contact with both buses of the one stud.

2. The wall structure of claim 1 additionally comprising a clip having an electrically insulative narrow body with an outwardly biased electrical contact disposed laterally on each side thereof and an end portion adapted to be removably anchored by said bracket-anchoring strip; said clip being configured and dimensioned such that, when said end portion thereof is inserted through said narrow aperture of one stud and anchored by said bracket-anchoring strip at any one of a plurality of different heights, said outwardly biased electrical contacts thereof are in electrically conductive contact with both buses of the one stud.

3. A clip adapted for use in the wall structure of claim 1 comprising an electrically insulative narrow body with an outwardly biased electrical contact disposed laterally on each side thereof and an end portion adapted to be removably anchored by said bracket-anchoring strip, said clip being configured and dimensioned such that, when said end portion is inserted through said narrow aperture of one stud and anchored by said bracket-anchoring strip at any one of a plurality of different heights, said outwardly biased electrical contacts are in electrically conductive contact with both buses of the one stud.

4. An electrified wall structure for removably positioning panels, clips and brackets and electrically energizing the clips, comprising:
(A) anchoring strips for removably receiving a clip or bracket at any of a plurality of different heights;
(B) a pair of laterally spaced apart, parallel, vertically arranged studs, each said stud defining a pair of laterally spaced apart, parallel, longitudinally extending, forwardly projecting panel-separating ribs forming together a longitudinally extending internal chamber therebetween housing one of said anchoring strips in longitudinal orientation and a longitudinally extending narrow aperture in the front of said internal chamber making said anchoring strip in said internal chamber accessible by a clip or bracket from the front of said stud, said studs defining together means for removably positioning a panel therebetween;
(C) a pair of laterally spaced apart, parallel, longitudinally extending, electrically conductive buses in each stud disposed at least partially in said internal chamber intermediate said narrow aperture and said anchoring strip without blocking access of a clip or bracket to said anchoring strip;
(D) means for electrically connecting said buses to an electrical power supply;
(E) a bracket having a narrow end portion inserted through said narrow aperture of one stud and anchored by said anchoring strip; and
(F) a clip having an electrically insulative narrow body with an outwardly biased electrical contact disposed laterally on each side thereof and an end portion inserted through said narrow aperture of said one stud and removably anchored by said anchoring strip, with said outwardly biased electrical contacts in electrically conductive contact with both buses of said one stud.

5. The wall structure of claim 4 wherein said buses are disposed in their entirety rearwardly of said narrow aperture and forwardly of said anchoring strip and are accesible from the front of said stud only through said narrow apeture.

6. The wall structure of claim 4 wherein said buses are accessible from the front of said stud only through said narrow aperture.

7. The wall structure of claim 6 wherein said narrow aperture is so narrow as to preclude passage of a human finger therethrough.

8. The wall structure of claim 4 wherein said buses extends substantially the entire length of said stud.

9. The wall structure of claim 4 wherein said studs are formed substantially of electrically conductive metal and additionally including a pair of a longitudinally extending, electrically insulative carriers disposed at least partially within said internal chamber without blocking access of the clip or bracket to said anchoring strip, each said carrier receiving therein the longitudinal length of a respective one of said buses and covering all sides of said one bus except for the longitudinal length thereof adapted to be contacted by the electrical contact of a clip removably anchored by said anchoring strip.

10. The wall structure of claim 9 wherein each said carrier is secured to said internal chamber and appropriately positions said one bus within said stud.

11. The wall structure of claim 9 wherein said carrier slidably receives said bus.

12. An electrified wall structure for removably positioning panels, clips and brackets and electrically energizing the clips, comprising:
(A) anchoring strips for removably receiving a clip or bracket at any of a plurality of different heights;
(B) a pair of laterally spaced apart, parallel, vertically arranged studs formed substantially of electrically conductive metal, each said stud defining a pair of laterally spaced apart, parallel, longitudinally extending, forwardly projecting panel-separating ribs forming together a longitudinally extending internal chamber therebetween housing one of said anchoring strips in longitudinal orientation and a longitudinally extending narrow aperture in the front of said internal chamber making said anchoring strip in said internal chamber accessible by a clip or bracket from the front of said stud, said studs defining together means for removably positioning a panel therebetween, said narrow aperture being so narrow as to preclude passage of a human finger therethrough;
(C) a pair of laterally spaced apart, parallel, longitudinally extending, electrically conductive buses in each stud disposed at least partially in said internal chamber intermediate said narrow aperture and said anchoring strip without blocking access of a clip or bracket to said anchoring strip, said buses extending substantially the entire length of said stud, being disposed rearwardly of said narrow aperture and forwardly of said bracket-anchoring strip, and being accessible from the front of said stud only through said narrow aperture;
(D) means for electrically connecting said buses to an electrical power supply;
(E) a bracket having a narrow end portion inserted through said narrow aperture of one stud and anchored by said anchoring strip;
(F) a clip having an electrically insulative narrow body with an outwardly biased electrical contact disposed laterally on each side thereof and an end portion inserted through said narrow aperture of said one stud and removably anchored by said anchoring strip, with said outwardly biased electrical contacts in electrically conductive contact with both buses of said one stud; and (G) a pair of longitudinally extending, electrically insulative carriers disposed at least partially within said internal chamber without blocking access of said clip or bracket to said anchoring strip, each said carrier slidably receiving therein the longitudinal length of a respective one of said buses and covering all sides of said one bus except for the longitudinal length thereof adapted to be contacted by the electrical contact of a clip removably anchored by said anchoring strip, each said carrier being secured to said internal chamber and appropriately positioning said one bus within said stud.

* * * * *